Sept. 13, 1927.   GODEFROY-RODOLPHE LUGINBUHL   1,642,616
RAILWAY GUIDE
Filed May 22, 1925

Godefroy R. Luginbuhl
    Inventor
William Clinton
By        Attorney

Patented Sept. 13, 1927.

1,642,616

UNITED STATES PATENT OFFICE.

GODEFROY-RODOLPHE LUGINBUHL, OF LAUSANNE, SWITZERLAND.

RAILWAY GUIDE.

Application filed May 22, 1925, Serial No. 32,135, and in Switzerland May 26, 1924.

This invention relates to a railway-guide provided with a diagrammatic table or index showing the various lines of railway communication, each line on the diagram leading to a particular station, designated by its name, and branching off from at least one station which is taken as the head station, the end of each branching or radiating line pointing towards the page of the railway-guide upon which is the time-table desired.

In order that the invention may be fully understood and readily carried out, one form of the railway-guide according to the invention is described hereinafter, by way of example, and illustrated in the accompanying drawing.

Figure 1:
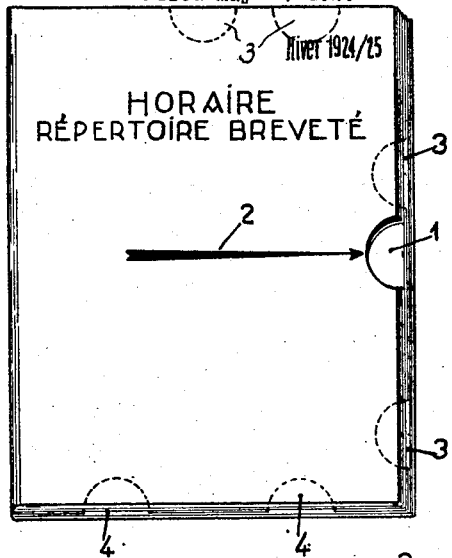
Figure 1 shows the railway-guide closed.
Figure 2:
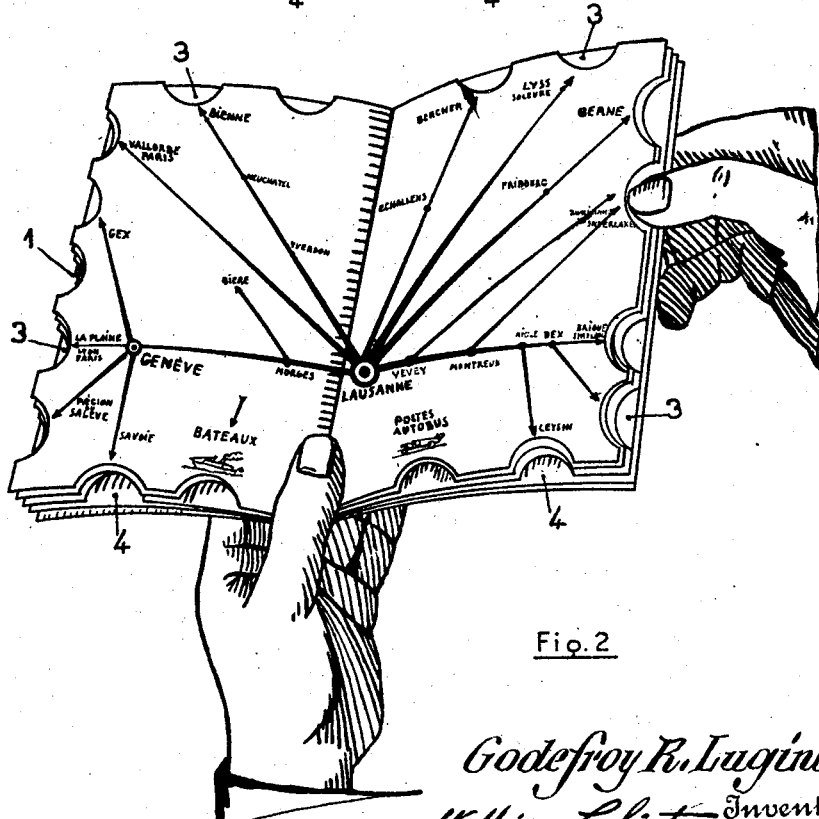
Figure 2 shows it open at the page of the directing table or index.

In the form of construction shown in the drawing the railway-guide is preferably constructed in book or pamphlet form and is provided with a thumb index notch 1 preferably upon the edge of the cover or first page of the railway-guide, by means of which notch the guide may be opened immediately to the diagrammatic directing table in the form of a schematic map or plan and situated preferably on the central double page of the book or pamphlet forming the guide.

In the drawing the map or plan shows, by means of lines bearing the names of stations, a diagram or plan of a local railway network, the stations being arranged to substantially correspond to their geographical positions, the town of Lausanne, in this example, being taken as centre and the lines radiating from this centre representing lines of railway starting from or reaching this town, such as:

Lausanne-Morges. Nyon, Geneva-Lyons; Lausanne-Vallorbe-Paris,

Lausanne - Yverdon - Neuchatel - Bienne- Bale,

Lake Leman steamboats, tramcars, etc.

At the end of and corresponding with each line of the directing table, a thumb index notch 3 is cut out in the edge of the pages of the railway-guide to enable the guide to be opened at the page upon which are printed the time tables and the information concerning the railway-traffic upon the corresponding main and secondary lines represented by the said lines of the diagram.

The directing table is not limited to serving as an index for the railway-lines but may be also completed with reference lines the ends of which terminate at corresponding thumb index notches, so that all the information it may include may be found out from the railway-guide by means of this device.

Having now particularly described and ascertained the nature of my said invention and in what manner the same is to be performed, I declare that what I claim is:—

1. A railway guide comprising a number of pages, a double page provided with a schematic map showing the names of various stations arranged to substantially correspond to their geographical positions and also provided with a number of lines indicative of railway communication lines radiating from at least one station and passing through some of the other stations and branching from the remaining stations, the remaining pages showing data of the various railway lines, the outer end of each line pointing towards the edge of the double page and the edges of the pages being thumb-notched at the end of each line as far as the corresponding data page.

2. A railway guide comprising a book containing a number of pages, a central double page provided with a schematic map showing the names of various stations arranged to substantially correspond to their geographical positions and also provided with a number of lines indicative of railway communication lines radiating from at least one station and passing through some of the other stations and branching from the remaining stations, the remaining pages showing data of the various railway lines, the outer end of each line pointing towards the edge of the double page and the edges of the pages being thumb-notched at the end of each line as far as the corresponding data page, the pages preceding said double page being further thumb-notched as far as the far side of the double page, and the front face of the front page being provided with a marking leading to said last mentioned thumb-notch.

In testimony whereof I have signed my name to this specification.

GODEFROY-RODOLPHE LUGINBUHL.